United States Patent
Park

(12) 
(10) Patent No.: US 6,285,650 B1
(45) Date of Patent: *Sep. 4, 2001

(54) OBJECTIVE LENS DRIVING APPARATUS OF AN OPTICAL PICKUP

(75) Inventor: Ho-Man Park, Chungju-shi (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,572

(22) Filed: Feb. 4, 1998

(30) Foreign Application Priority Data

Feb. 4, 1997 (KR) .................................. 1614/1997

(51) Int. Cl.[7] .................................................. G11B 17/00
(52) U.S. Cl. .................................................. 369/244
(58) Field of Search ................... 369/244, 112, 369/44.16, 44.22, 44.23; 359/824, 813

(56) References Cited

U.S. PATENT DOCUMENTS

| | | | |
|---|---|---|---|
| 5,687,032 | * 11/1997 | Takeshita et al. | 359/822 |
| 5,706,270 | * 1/1998 | Iizuk et al. | 369/112 |
| 5,724,337 | * 3/1998 | Kawano et al. | 369/244 |
| 5,870,373 | * 2/1999 | Choi et al. | 369/244 |
| 5,886,978 | * 3/1999 | Matsui | 369/244 |
| 6,018,509 | * 1/2000 | Itoh et al. | 369/244 |

* cited by examiner

*Primary Examiner*—Dung C. Dinh
*Assistant Examiner*—Ted Kupstas

(57) ABSTRACT

An objective lens driving apparatus of an optical pickup is constructed to enable the accurate focusing control and slimming, which includes a mover having a focusing coil winding part formed with a prescribed inclination to a horizontal plane and a beam passing part formed in the lower portion of the focusing coil winding part for allowing beam from a light source to pass therethrough by using the inclination. In addition to the mover, an objective lens loaded on the upper portion of the mover while having a center substantially coinciding with that of the mover is provided to lead the beam to pass through the lower side of the mover while being capable of coinciding the centers of the objective lens and mover.

4 Claims, 5 Drawing Sheets

OBJECTIVE LENS DRIVING APPARATUS OF AN OPTICAL PICKUP

BACKGROUND OF THE INVENTION

1. Field of the Invention

The present invention relates to an apparatus for driving an optical pickup, and more particularly to a driving apparatus of an optical pickup capable of being further slimmed and obtaining more accurate operating characteristics while coinciding centers of an objective lens and a mover.

2. Description of the Prior Art

A driving apparatus of an optical pickup indicates a device which performs tracking and focusing control with respect to playback signals of a recording medium by moving a loaded objective lens up and down and right and left. At this time, the focusing denotes the operation of moving the objective lens up and down for permitting a spot of beam focused by the objective lens to be accurately focused onto a recording plane of a disc. Also, the tracking denotes the operation of moving the objective lens right and left for permitting the spot of focused beam to accurately trace a path of a track of an optical disc.

A conventional driving apparatus will be described with reference to FIGS. 1A and 1B. As illustrated, the driving apparatus includes a mover 1 loaded with an objective lens 2 thereon and an outer yoke 8 formed along the outer circumference of mover 1. Mover 1 constituted by a plastic resin substance is wound with a tracking coil 3 for executing tracking control and a focusing coil 4 for focusing control. Here, focusing coil 4 winds around the whole outer circumference of mover 1, and tracking coil 3 winds about right and left portions thereof.

The current supply to coils 3 and 4 is conducted by four wires 6 connected with a printed circuit board 7 fixed to a frame 9. The other ends of wires 6 are soldered to predetermined places of mover 11 to be connected to coils 3 and 4, thereby supplying the current. That is, while wires 6 support mover 1 loaded with objective lens 2, mover 1 is moved up and down and right and left by means of flux formed by the supplied current, thereby performing the focusing control and tracking control.

Outer yokes 8 attached with a magnet 5 onto the inside are installed onto both right and left sides of mover 1, and inner yokes 11 within mover 1 are mounted onto the opposing sides of outer yokes 8 by interposing magnet 5. Inner yoke 11 is furnished for forming a predetermined path of the magnetic flux from magnet 5.

As mentioned above, the outer circumference of conventional mover 1 loaded with objective lens 2 is wound with tracking coil 3 and focusing coil 4. Focusing coil 4 winds around the up and down portions of the outer circumference of mover 1 by a prescribed width, and tracking coil 3 partially winds about the right and left portions which face with magnet 5. Once coils 3 and 4 are supplied with the current, in accordance with the direction of the current supplied and direction of the magnetic flux incited by magnet 5, mover 1 is applied with a force in conformity with the Fleming's Left-hand Rule to thus carry out the tracking control and focusing control while moving up and down or right and left. At this time, the intensity of the force is decided in proportion to the relation of the magnetic flux of magnet 5, effective length and number of turns of coils 3 and 4 and intensity of the current.

Also, the beam emitted from a light source 10 is reflected toward the objective lens side by means of a mirror 12 disposed onto the lower side of mover 1, and the beam under the state of being focused by objective lens 2 is, prior to being reflected again, radiated onto the surface of an optical disc D which is the recording medium. An optical signal reflected in this way is to be reproduced by being converted into an electric signal via an unshown photodetector.

In accordance with the conventional construction, the beam emitted from light source 10 is to be reflected toward the objective lens side by means of mirror 12 disposed onto the lower end portion of mover 1. That is, it can be appreciated that mirror 12 is mounted to the lower portion of mover 1 for leading the beam from light source 10 to be incident to objective lens 2 without incurring any interference. Therefore, in order to inhibit the interference of mover 1, especially focusing coil 4, upon the beam, mirror 12 must be placed to the lower portion of mover 1 to result in a problem of increasing overall height.

In particular, since focusing coil 4 winds around the outer circumference of mover 1, there is a certain restriction in shortening a distance between mirror 12 which reflects the beam generated from light source 10 and objective lens 2. This significant drawback deleteriously affects the scale-down of the optical pickup device in the conventional structure in which the centers of objective lens 2 and mover 1 coincide with each other.

Another conventional optical pickup device further minimized by considering the foregoing drawbacks is illustrated in FIGS. 2A and 2B. In such a conventional structure, the optical pickup device can be minimized by separating respective centers $C_1$ and $C_2$ of a mover 1' wound with a tracking coil and a focusing coil and an objective lens 2'. It is constructed that mover 1' loaded with objective lens 2' is spaced apart from one side of objective lens 2', making it possible to install mirror 12' for reflecting the beam from a light source 10' to be nearer to objective lens 2'. More specifically, center point $C_1$ of objective lens 2' is spaced apart from center point $C_2$ of mover 1' by as long as a prescribed distance D, so that the coils winding around mover 1' do not incite the interference with the beam produced from light source 10'. By doing so, mirror 12' can be installed by being closer to the upper portion to enable to scale-down the product.

However, in the conventional structure formed as above, when objective lens 2' is moved up and down as shown in FIG. 2A for performing the focusing control, centers $C_1$ and $C_2$ of objective lens 2' and mover 1' do not coincide with each other. For this reason, objective lens 2' is not moved up and down under the horizontal state but substantially conducts the circular arc motion slanted as many as a prescribed angle with respect to center point $C_2$ of mover 1'. Consequently, the precise motion characteristics cannot be produced due to the aforementioned motion to have an unstable characteristic in a specific frequency band, thereby exerting a bad influence upon the record/playback of the optical pickup.

SUMMARY OF THE INVENTION

The present invention is devised to solve the above-enumerated problems. Therefore, it is an object of the present invention to provide an optical pickup device capable of being slimmed while involving further precise control characteristic.

To achieve the above object of the present invention, an objective lens driving apparatus according to the present invention includes a mover having a focusing coil winding part formed with a prescribed inclination with respect to a horizontal plane, and a beam passing part formed in the lower portion of the focusing coil winding part for allowing beam from a light source to pass therethrough by using the inclination. Also included as part is an objective lens loaded on the upper portion of the mover while having a center substantially coinciding with that of the mover.

Preferably, a sub-magnet for forming a magnetic flux is further formed to the inside of a focusing coil mounted to the focusing coil winding part to induce sufficient generation of the magnetic flux, making it possible to precisely perform the focusing control and tracking control.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

An optical pickup device according to the present invention will now be described in detail with reference to attached drawings.

Figure 1A:
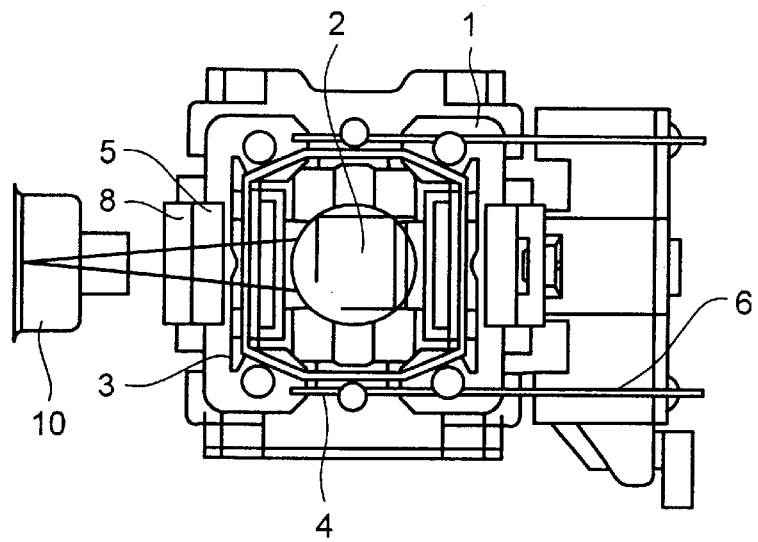
FIG. 1A is a plan view showing a conventional optical pickup driving apparatus.
Figure 1B:
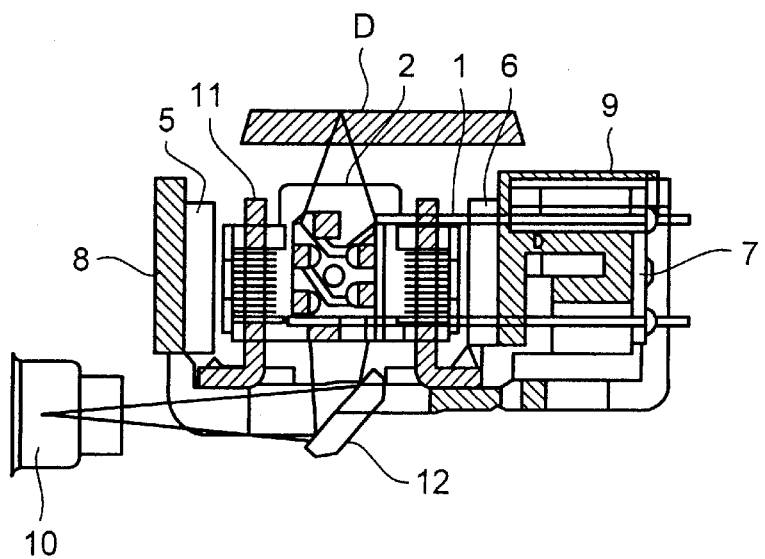
FIG. 1B is a front view showing the conventional optical pickup driving apparatus.
Figure 2A:
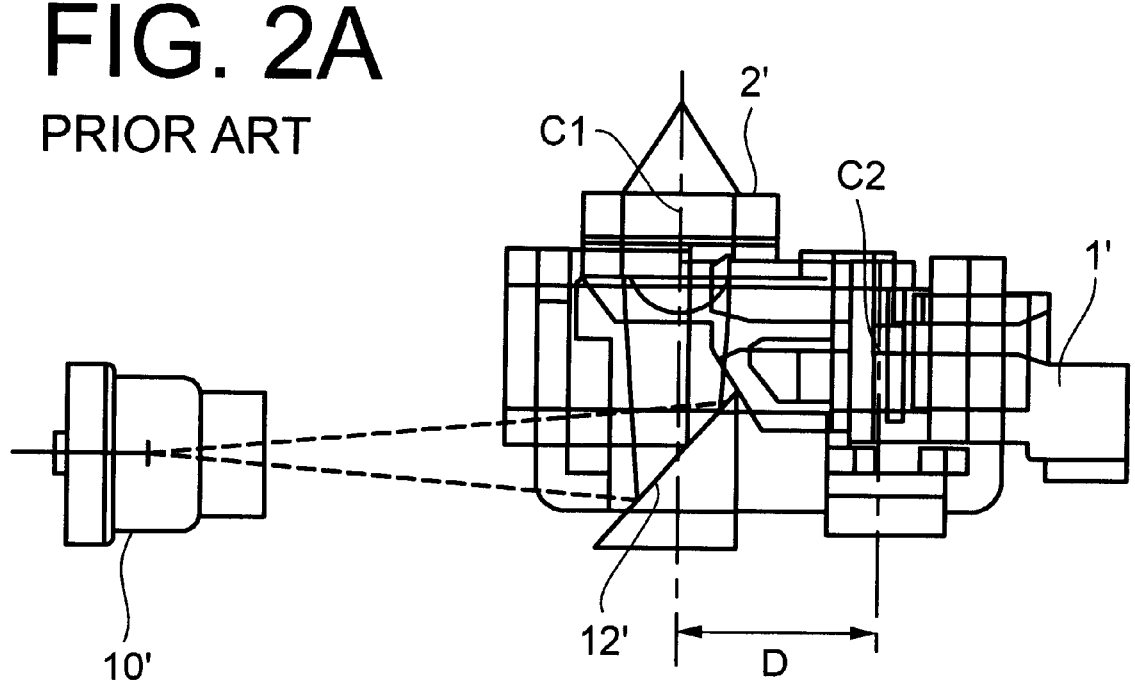
FIG. 2A is a front view showing another conventional optical pickup driving apparatus.
Figure 2B:
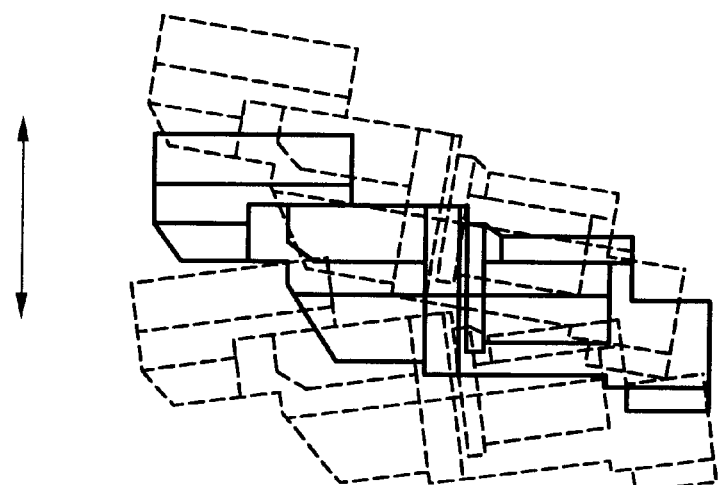
FIG. 2B is a view for illustrating the focusing control operation of the optical pickup device shown in FIG. 2A.
Figure 3:
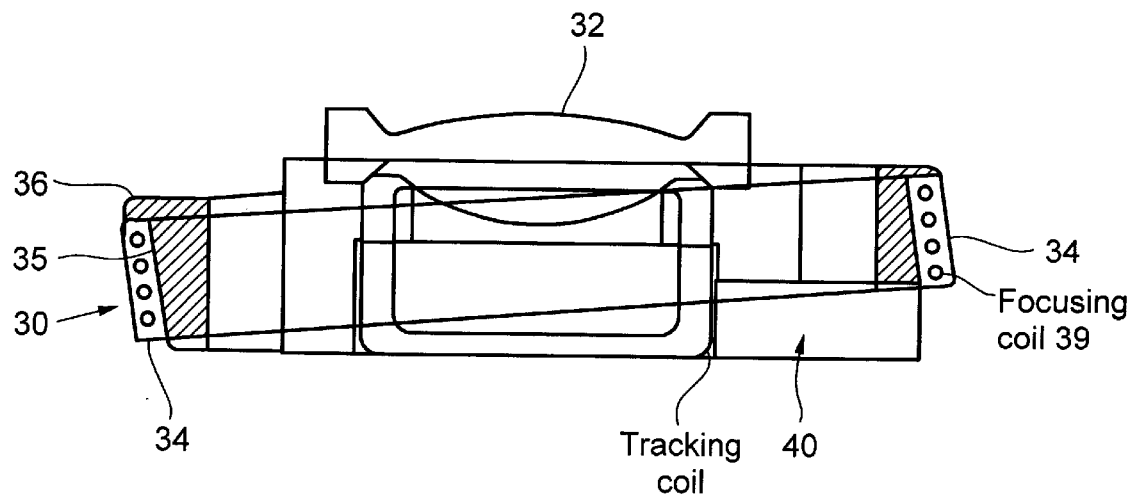
FIG. 3 is a front view showing construction of a mover according to this invention.
Figure 6:
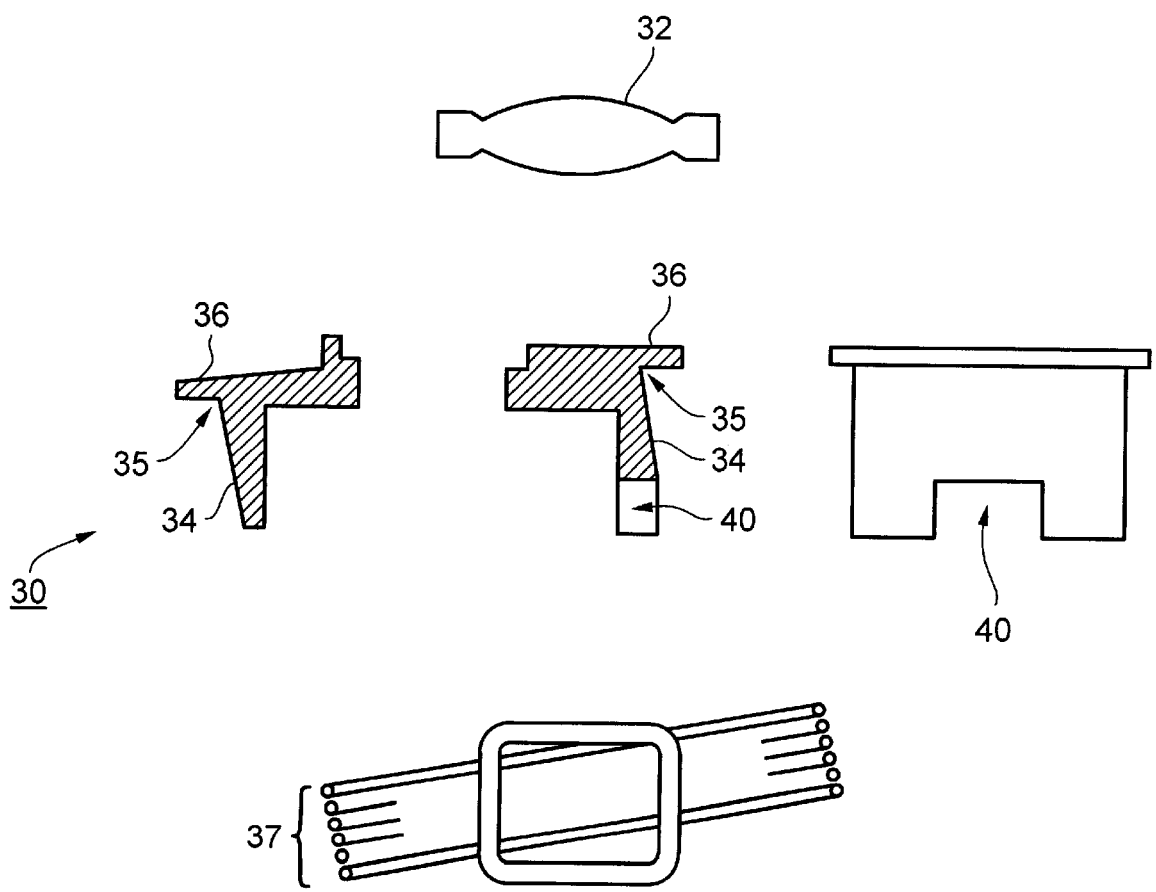
FIG. 6 is a sectional view of the mover comprising a beam passing part, a coil winding part, a projection portion, and a groove portion, in relation to the focusing coil, the tracking coil, and the lens according to this invention.

As shown in FIGS. 3 and 6, a mover 30 according to the present invention has a focusing coil winding part 34 at the outer circumference. The focusing coil winding part 34 is formed to have a prescribed inclination with respect to a horizontal plane. By forming focusing coil winding part 34 to have the prescribed inclination, a focusing coil 37 winds around the outer circumference of mover 30 by involving the prescribed inclination of focusing coil winding part 34. At this time, a guide groove portion 35 and projecting portion 36 for guiding focusing coil is furnished to the outer side of mover 30. Thus, the lower portion of the focusing coil that is wound by involving the inclination, i.e., the lower end of mover 30 where the focusing coil winds upward in mover 30, is formed to allow for attaining the slimmer structure by leading the beam from a light source to be incident to the interior of mover 30.

Mover 30 according to the present invention is loaded with an objective lens 32 onto the upper portion thereof, and a center axis of objective lens 32 coincides with a center axis of mover 30. Also, in the inclined focusing coil winding part 34, mover 30 corresponding to the lower portion of upwardly winding focusing coil winding part 3 is formed with a beam passing part 40 through which the beam from the light source passes.

Beam passing part 40 may be provided by partially cutting off the lower side of mover 30 to permit the beam from the light source to pass therethrough or may be formed by a thruhole capable of passing the beam through the corresponding portion of mover 30.

Furthermore, according to the present invention, the foregoing focusing coil winding part 34, the prescribed inclination with respect to the horizontal plane is provided to the focusing coil that winds around mover 30, and simultaneously, beam passing part 40 capable of passing the beam from the light source therethrough is formed into mover 30 corresponding to the lower portion of the upwardly winding focusing coil, thereby enabling to be slimmed.

Additionally, it is preferable that the slope angle of the inclined focusing coil winding part is determined between 4 to 10 degrees in view of the optical path. However, it will be appreciable that the slope angle is not restrictive but, while the focusing coil which winds mover 30 is wound by involving the prescribed inclination, may be modified within a range of forming beam passing part 40 capable of allowing the beam from the light source to pass therethrough into the lower end portion without being wound with the focusing coil.

Hereinbelow, overall construction of the apparatus for driving the objective lens according to the present invention will be described with reference to FIG. 4.

Figure 4:
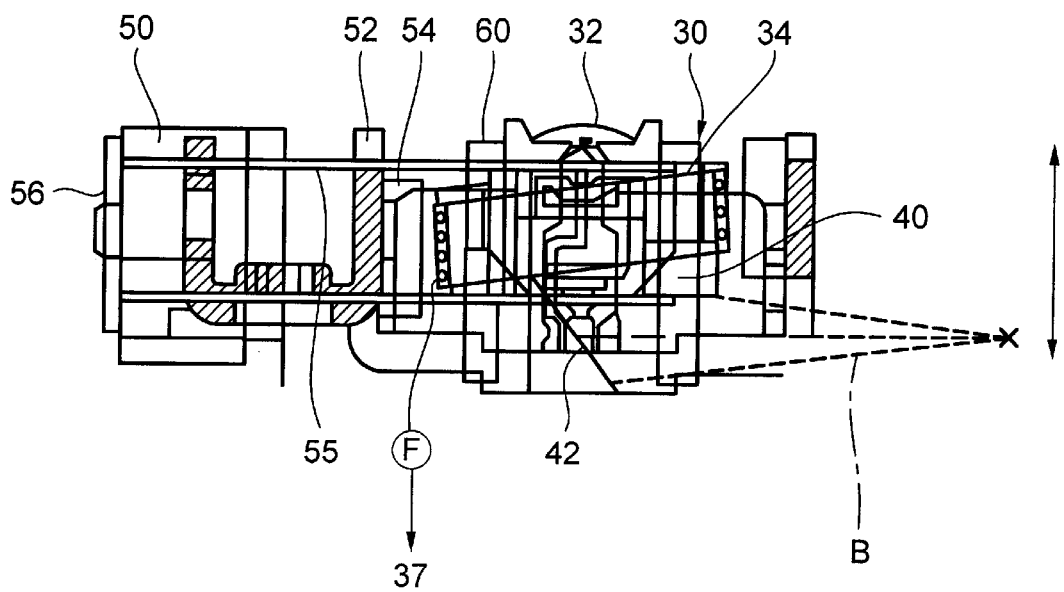
FIG. 4 is a front view showing an optical pickup driving apparatus employing the mover shown in FIG. 3 according to this invention.

Referring to FIG. 4, mover 30 equipped with focusing coil winding part 34 having the prescribed inclination with respect to the horizontal plane is supported under the state of being connected with a spring wire 55. Here, spring wire 55 is fixed to the rear side of a printed circuit board 56 which is attached to the rear plane of a frame 50 via soldering and connected to an external power source, and is electrically connected with the focusing coil that winds around mover 30.

In connection with mover 30, it is constructed that beam B from the light source (not shown) can be incident through the portion of being formed with beam passing part 40, i.e., the lower portion of mover 30 with slantedly winding focusing coil 37 as turning upward. That is, while beam B from the light source is incident to beam passing part 40 of mover 30 without being interfered, it is reflected to objective lens 32 disposed to the upper portion of mover 30 by mirror 42, and is in turn focused onto the disc surface by objective lens 32 to be capable of reproducing the recorded signal.

In addition, a magnet 54 for generating the magnetic flux is installed to the outer side of mover 30 while being inwardly supported by an outer yoke 52. The focusing control and tracking control performed while mover 30 is moved up and down or right and left in accordance with a force produced by the direction of current supplied to focusing coil 37 and the tracking coil which wind around mover 30 from printed circuit board 56 via spring wire 55 and the direction of magnetic flux generated by magnet 54 are identical to those by the conventional technique, of which detailed description will thus be omitted.

As can be noted in the above-described construction, mover 30 according to the present invention is provided with focusing coil winding part 34 having the prescribed inclination with respect to the horizontal plane and beam passing part 40 capable of passing the beam from the light source therethrough. Therefore, the inner yoke employed for auxiliarily forming the path of the magnetic flux by the magnet can be deleted. At this time, in order to complement the weakening of the magnetic flux path resulting from the deletion of the inner yoke, it is possible to separately furnish a sub-magnet for supplementing the magnetic flux path to generate stronger magnetic flux.

In other words, as illustrated, sub-magnet 60 is installed to the inner mover portion of focusing coil 37 of mover 30 to make the magnetic flux generated by magnet 54 be stronger path. At this time, sub-magnet 60 installed to the inner mover portion of focusing coil 37 should be installed to form the path identical to that of the magnetic flux by magnet 54.

By the foregoing construction, while preventing the loss of the magnetic flux incited when the inner yoke is deleted from mover 30 according to the present invention provided with inclined focusing coil winding part 34 and beam passing part 40, the stronger magnetic flux can be formed.

Figure 5:
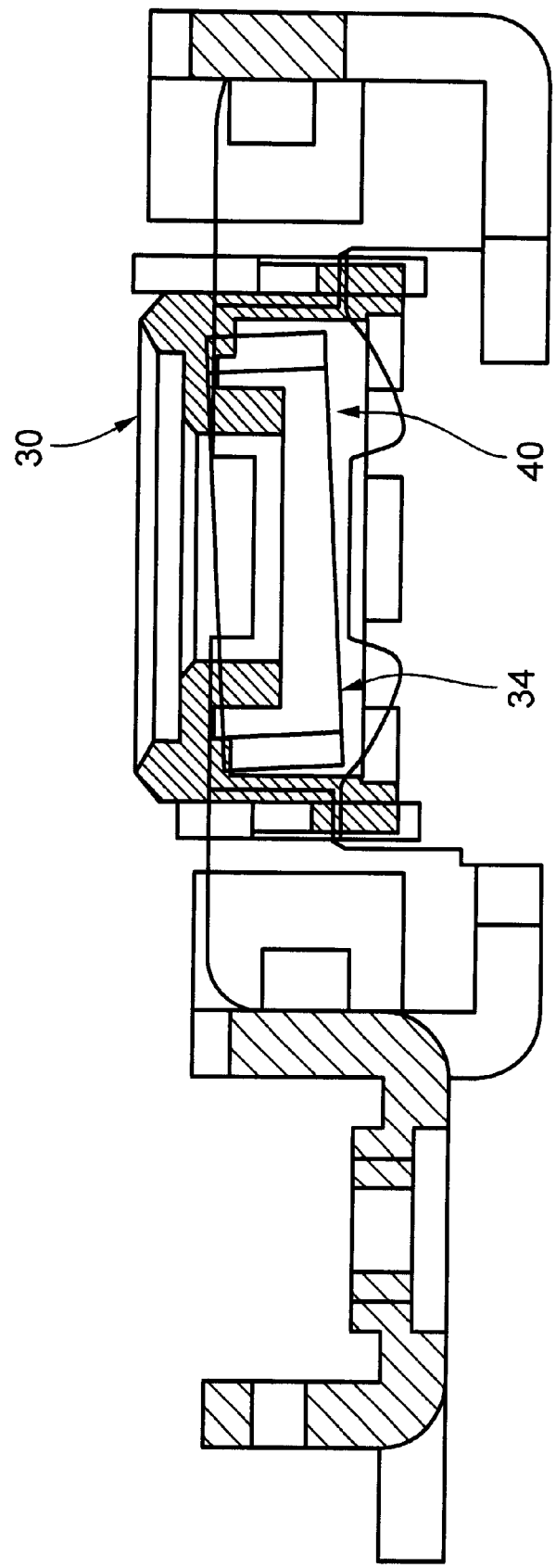
FIG. 5 is a front view showing another embodiment of an optical pickup driving apparatus according to this invention.

FIG. 5 illustrates another embodiment of an objective lens driving apparatus of an optical pickup according to the present invention.

As shown in FIG. 5, the focusing coil winding part 34 is mounted on the inner side of the mover 30 in order to permit the beam from the light source to pass through the beam passing part 40.

Further explanation on the operation of the objective lens driving apparatus of an optical pickup shown in FIG. 5 will be omitted since the construction except the mounting of the focusing coil winding part 34 on the inner side of the mover 30 is basically the same as that of FIG. 4

The present invention as described above has the following effects.

By the focusing coil that is wound via the focusing coil winding part slantedly formed to the mover according to the present invention, the interference upon the beam from the light source can be prevented. Also, the distance between the beam incident direction via the beam passing part formed in the mover and the objective lens can be shortened to the maximum. Additionally, the mover is installed to lead its center to substantially coincide with the center of the objective lens, so that the mover moved up and down for performing the focusing control conducts the up and down motion under the stable state of involving no abnormal vibration.

Consequently, since the stable and accurate motion characteristic is afforded during performing the focusing control, it is advantageous of enhancing the reliability of the recording/reproducing of the disc and, simultaneously, enabling the slimming of the optical pickup device.

Furthermore, the sub-magnet is formed to the inner side of the focusing coil that slantedly winds as above to allow for generating the magnetic flux sufficiently, thereby presenting the precise control characteristic.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup device, comprising:

an objective lens located on a mover for directing a light beam to a center of the objective lens, the objective lens having a center axis oriented perpendicular thereto;

said mover comprising:

an upper portion, a lower portion, and a side portion, a coil winding part formed on an outer surface of the side portion, the coil winding part having a center axis that has a different direction from said center axis direction of the objective lens, and a coil that is wound onto the coil winding part, the mover defining an opening capable of passing said light beam incident from a light source, so that the coil does not obstruct the opening.

2. An optical pickup device as claimed in claim 1, wherein the center of the objective lens coincides with a center of mover.

3. An optical pickup device as claimed in claim 1, further comprising a guide groove portion furnished to said mover for guiding said coil.

4. An optical pickup device as claimed in claim 1, further comprising a projecting portion furnished to said mover for guiding said coil.

* * * * *